United States Patent [19]

Yanagisawa et al.

[11] 4,069,360
[45] Jan. 17, 1978

[54] MAGNETIC RECORD MEMBER AND PROCESS FOR MANUFACTURING THE SAME

[75] Inventors: Masahiro Yanagisawa; Yoji Suganuma, both of Tokyo, Japan

[73] Assignee: Nippon Electric Company, Ltd., Tokyo, Japan

[21] Appl. No.: 734,962

[22] Filed: Oct. 22, 1976

[30] Foreign Application Priority Data

Oct. 31, 1975  Japan .................................. 50-132005

[51] Int. Cl.² .......................... G11B 5/74; B32B 3/02; B05D 5/12
[52] U.S. Cl. ..................................... 428/64; 360/131; 360/135; 427/130; 427/131; 427/399; 428/65; 428/420; 428/429; 428/447; 428/900
[58] Field of Search ................... 428/64, 65, 429, 447, 428/450, 900, 420; 427/130, 131, 399; 360/135, 131

[56] References Cited

U.S. PATENT DOCUMENTS

| | | | |
|---|---|---|---|
| 3,466,156 | 9/1969 | Peters et al. | 427/131 |
| 3,516,860 | 6/1970 | Simmons | 427/131 |
| 3,522,075 | 7/1970 | Kiel | 428/447 |
| 3,958,073 | 5/1976 | Trevisan et al. | 427/399 |
| 3,993,846 | 11/1976 | Higuchi et al. | 428/447 |
| 4,005,242 | 1/1977 | Kopke et al. | 428/447 |

*Primary Examiner*—William R. Dixon, Jr.
*Attorney, Agent, or Firm*—Ostrolenk, Faber, Gerb & Soffen

[57] ABSTRACT

Magnetic storage means which may be a disc having a magnetic storage layer coated with a protective layer. The protective layer, which is preferably an inorganic oxide material, protects the magnetic storage layer from corrosion. A lubricant is applied to the protective layer and serves to reduce wearing due to frictional drag between the disc and a cooperating magnetic head (or heads). The lubricant is oriented so as to make very good adherence with the oxide sublayer and thereby prevent removal of the lubricant through continued use and/or cleaning.

23 Claims, 4 Drawing Figures

1 - ALLOY DISC
2 - NON-METALLIC ALLOY
3 - MAGNETIC METAL THIN FILM
4 - AMORPHOUS INORGANIC OXIDE
5 - ORIENTED LUBRICANT

SURFACE COUPLING AGENT

GLASS SURFACE

GLASS

MAGNETIC RECORD MEMBER AND PROCESS FOR MANUFACTURING THE SAME

BACKGROUND OF THE INVENTION

This invention relates to a magnetic record member for use in magnetic recording devices such as a magnetic disc and a magnetic drum and a process for manufacturing the same. In general, recording and reproducing systems for the magnetic recording device consisting of heads for recording and reproducing (referred to simply as "head" hereinafter) and magnetic record members may be classified into two types. In one system, upon initiation of operation, a head is brought into contact with the surface of a magnetic record member and then, the record member is rotated at a given speed in a manner to provide a spacing between the head and the magnetic record member surface, thereby enabling the recording and reproducing operations. According to this system, upon completion of operation, rotation of the record member is stopped in a state where the head and the record member are maintained in frictional contact with each other as in the case with the starting of operation.

In another system, after the magnetic record member is rotated at a given speed beforehand, the head is suddenly urged against the record member surface to give a spacing due to an air layer created between the head and the record member so as to perform the recording and reproducing operations. In this manner, according to the first system, the head is maintained in frictional contact with the magnetic record member surface both upon initiation and completion of the operation. On the other hand, in the second system, the head is maintained in frictional contact with the magnetic record member surface when it is urged against the magnetic record member surface. Such frictional contact tends to wear both the head and the record member and to harm a magnetic metal thin film medium formed on the record member. Also, in such a frictional contact state, a slight change of the head-attitude makes a load imposed on the head non-uniform so that the head and the record member are damaged.

In addition, the frictional force exerted by the frictional contact of the head with the magnetic record member surface causes a large torque to a motor, particularly in case where a plurality of heads are used, which imposes an undesirable load on the motor adapted to rotate the record member Furthermore, in case where the head unexpectedly, and usually abruptly, contacts the record member surface, both the head and record member are damaged due to a large frictional force present between the head and the record member.

For the purpose of protecting the head and magnetic record member from the aforesaid frictional force caused between the head and the record member, it is required to provide a protective film on the surface of the magnetic record member. The protective film in this respect should minimize the frictional force exerted between the head and the magnetic record member or, in other words, the protective film must provide as low a coefficient of friction as is practical.

In this connection, the provision of a lubricant layer on the surface of the magnetic record member is one method to minimize the frictional force.

U.S. Pat. No. 3,466,156 discloses the provision of such a lubricant layer of natural or synthetic wax on the surface of the magnetic record member. However, the lubricant layer of wax fails to give a sufficient adhesion to an underlayer so that the wax layer is peeled from the underlayer due to a plurality of cycles of repeated frictional contacts of the head against the magnetic record member, thus failing to meet the intended practicability. For this reason, the aforesaid lubricant layer must adhere to the underlayer in a satisfactory manner. Insufficient adhesion of the lubricant layer to its underlayer results in the peeling of the lubricant layer from the underlayer due to a frictional force caused between the head and the magnetic record member and/or results in the accumulation of lubricant between the head and the record member or around the head due to capillarity. As a result, detrimental influences are imposed on the flying stability of the head during the recording and reproducing operations.

The interposition of a nonpolar molecular layer invulnerable to adsorption or adhesion to the head surface along an interface between the head and the magnetic record member contributes to the minimization of a frictional force exerted between said lubricant layer and the head. In other words, it is preferable that the lubricant layer is oriented so as to create a portion combining the magnetic record member and a nonpolar portion reluctantly adhering or absorbing to the head surface.

BRIEF DESCRIPTION OF THE INVENTION AND OBJECTS

It is an object of the present invention to provide a magnetic record member and a process for manufacturing the same free of the above-mentioned shortcomings experienced with the prior art magnetic record members.

The present magnetic record member comprises an alloy disc coated with a non-magnetic alloy layer and polished to a mirror finish or an alloy disc polished to a mirror finish, a magnetic metal thin film medium coated on the surface of the alloy disc, an amorphous inorganic oxide layer coated on said medium and a lubricant layer oriented to adhere to the amorphous inorganic oxide layer and coated on said oxide layer.

The present manufacturing process for the magnetic record member comprises the steps of: forming a magnetic metal thin film medium on an alloy disc coated with a non-magnetic alloy layer and polished to a mirror finish or on the surface of an alloy disc polished to a mirror finish, coating an amorphous inorganic oxide layer on the surface of the medium, applying lubricant having orientation onto the oxide layer or baking the same after applying the lubricant onto the oxide layer so that the oxide layer may adhere to the lubricant.

Thus, the present invention is capable of presenting a magnetic record member having a protective film coated with a lubricant layer which serves to reduce any frictional force exerted between the head and the record member and which can not be removed, due to either the frictional force or to the periodic cleaning operations required for the maintenance of the magnetic record member, because of the tight bonding of the lubricant layer to its underlayer.

BRIEF DESCRIPTION OF THE FIGURES

These and other objects and features of the present invention will be described more in detail in conjunction with the accompanying drawings which indicate embodiments of the invention in which.

DETAILED DESCRIPTION OF THE INVENTION AND PREFERRED EMBODIMENTS THEREOF

Figure 1:
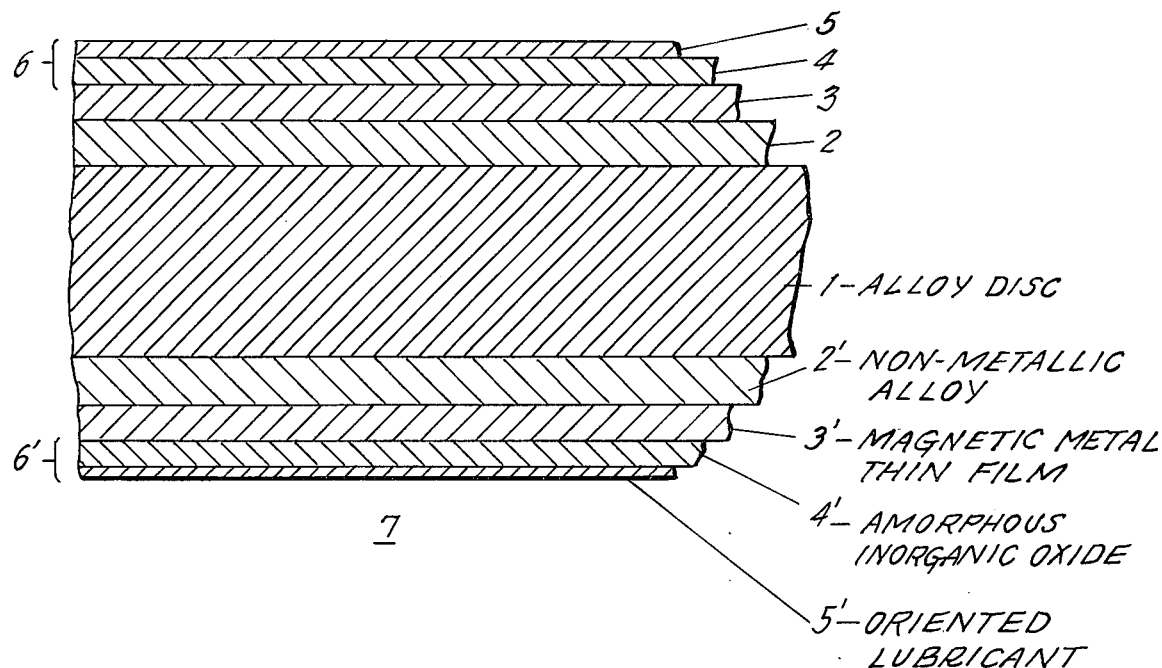
FIG. 1 shows a cross-sectional view of one embodiment of a magnetic record member of the present invention.

In FIG. 1, a magnetic record member 7 of the present invention comprises an alloy disc 1, a non-magnetic alloy layer 2 coated on the alloy disc surface, a magnetic metal thin film medium 3 coated on the polished surface of the alloy layer 2, an amorphous inorganic oxide layer 4 coated on the surface of the medium 3 and a lubricant layer 5 coated on the oxide layer 4 and oriented to adhere to the oxide layer 4. The opposite side of the disc 1 may be treated with similar layers 2', 3', 4' and 5', as shown.

The alloy disc 1 must be finished to a slightly topographic surface into more than 50 $\mu$ 50 microns) in the circumferential direction and no more than 10 $\mu$ (10 microns) in the radial direction of the disc).

This is because an increase in in topograph leads to a failure of a head to satisfactorily float or fly above the magnetic record member surface upon recording or reproducing with the result that variation occurs in the spacing of the head from the record member which, in turn, varies the recording and reproducing characteristics of the record member, either in the case where the head makes contact with the record member surface or in the case where the head is spaced from the member surface.

The surface of the non-magnetic alloy layer 2 plated on the surface of the alloy disc 1 is highly polished to a surface of roughness less than 0.04 $\mu$ by mechanical polishing. It is to be noted that if a metal sheet polished to a mirror surface is used as the alloy disc 1, the alloy layer 2 is unnecessary. The thin film medium 3 adaptable for high-density recording is then plated on the surface of the alloy layer 2. A protective film 6 for protecting the thin film medium 3 from the frictional contact with a head or from corrosion due to ambient humidity or temperature consists of the amorphous inorganic oxide layer 4 having a sufficient hardness and adhesion to the film medium 3 and a lubricant layer 5 having a sufficient adhesion to the oxide layer 4 and oriented so as to exert a reduced frictional force against the head.

The greater the thickness of the protective film 6 (and/or 6'), the greater will be the protection of the magnetic metal thin film medium. However, for the sake of recording and reproducing of the magnetic record member, a smaller spacing (between the head and the surface of the record member, upon recording and reproducing) is more advantageous. For this reason, it is essential to minimize the thickness of the protective film 6. In this respect, a thickness of less than 0.1 $\mu$ is preferable, considering the strength of the protective film 6. Also, the thickness of the lubricant layer 5 may be sufficiently reduced so that the thickness of the oxide layer 4 can be increased so as to give a desired strength.

The amorphous inorganic oxide layer 4 is a layer of polysilicate consisting of a condensated polymer of tetrahydroxysilane or an amorphous semi-metal oxide generally referred to as glassy materials such as quartz glass ($SiO_2$ glass), silicate glass, borate glass, borosilicate glass, phosphate glass or amorphous alumina, etc. The latter is coated according to a spattering process, while the former is coated according to the application of a liquid. It is to be noted that the magnetic record member having a protective film of polysilicate and its manufacturing process are disclosed in the copending U.S. patent application Ser. No. 700,191, filed June 28, 1976 and assigned by the same inventors to the assignee of the present invention.

Figure 2:
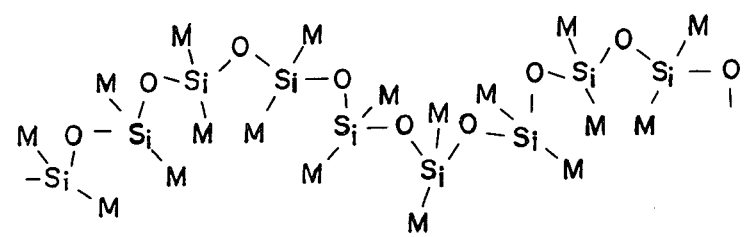
FIGS. 2 and 3 are diagrams for explaining one lubricant having orientation for use in the present invention.
Figure 3:
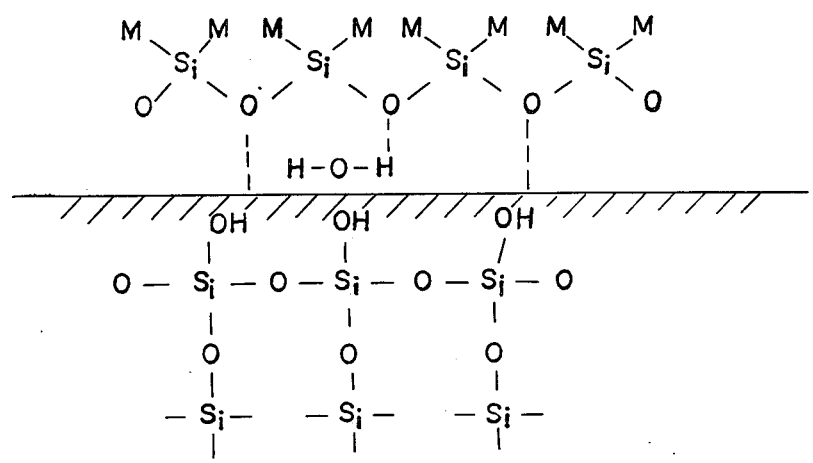

The oriented lubricant layer 5 coated on the surface of the oxide layer 4 adheres tightly thereto and causes only a small frictional force to be applied against the head. The lubricant having the desired orientation includes oil groups consisting of silicone oil, fluoric oil, fluorosilicone oil and a silane or silazane group such as octadecyltrichlorosilane, hexamethyldisilazine, N,N-dimethyl-N-Octadecyl-3-aminopropyltri-methoxysilyl-chloride (DMOAP), dimethyldichlorosilane and the like (these will be referred to as surface coupling agents, hereinafter). The term "orientation" as used herein comes from the fact that the molecular structure of lubricant is so oriented as to cause a portion to adhere to its underlayer and a portion more or less free of adhesion and rich in lubricity to be engaged by the head. For instance, the dimethylsilicone oil has a helical or coil-like structure as shown in FIG. 2.

Simple application of the dimethylsilicone oil onto the oxide layer 4 provides an insufficient adherence and as a result, the film is easily removed when subjected to cleaning. In addition, if the film is not clean, the oil is collected around the head, thereby exerting an adverse influence on the flying condition of the head. When the dimethylsilicone oil is applied onto the surface of the oxide layer 4 and baked thereafter, the dimethylsilicone oil layer will be so oriented as to provide a portion containing oxygen and adhereing to its underlayer and a portion containing a methyl radical and having a sufficient lubricity. The portion of the dimethylsilicone oil containing oxygen chemically adheres by hydrogen bond to water which is adsorbed to the surface of the oxide layer 4 consisting of a film of polysilicate or $SiO_2$ glass and aluminar obtained by a spattering method and used as underlayers, and to silanol radicals (Si—OH) present on the surface of the oxide layer 4.

On the other hand, the octadecyltrichlorosilane serving as a surface coupling agent and having the following structure becomes a reactive compound containing silanol radicals (Si—OH) resulting from hydrolysis with water:

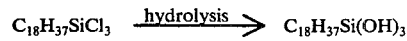

In this compound consisting of a portion containing the silanol radicals which adhere to an underlayer and a portion containing the octadecyl radical (—$C_{18}H_{37}$) showing a desired lubricity, the former portion containing the silanol radicals strongly adheres to the underlayer because the silanol radicals (Si—OH) contained in the surface coupling agent causes the following dehydration-condensation-polymerization reaction (I) with water adsorbed to the surface of the amorphous inorganic oxide layer 4 consisting of a polysilicate film and a spattered film made of $SiO_2$, glass and alumina and with silanol radicals (Si—OH) present on the surface of the oxide layer 4.

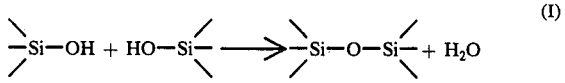

(I)

Figure 4:
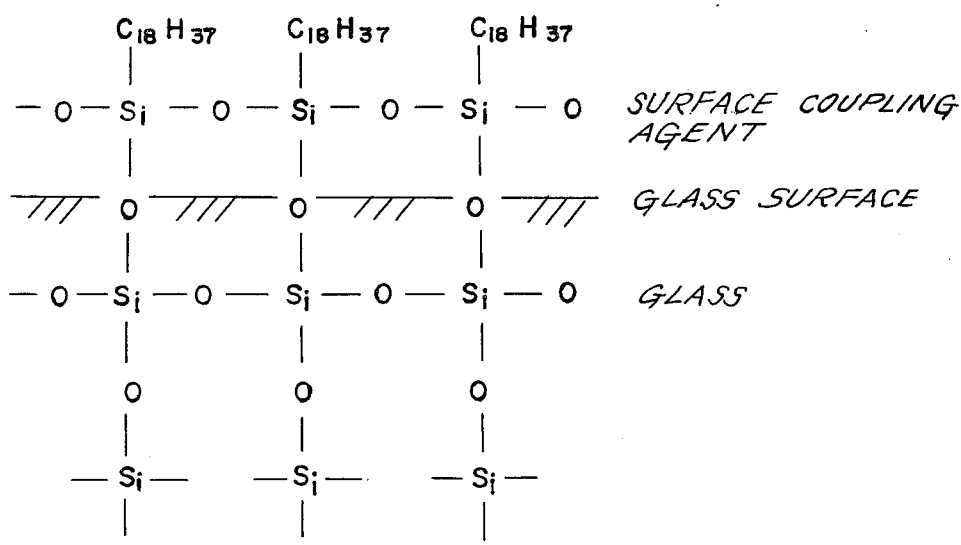
FIG. 4 shows a diagram showing another lubricant for use in the present invention.

Although the above reaction takes place at room temperature, if heated, a further complete reaction will take place. The structure of a lubricant layer made of a surface coupling agent, which is formed on the surface of the oxide layer 4 is shown in FIG. 4. In this case, it is possible to make the thickness of the lubricant layer made of oil or the surface coupling agent extremely thin in the following manner:

A lubricant layer quite similar to a monolecular layer is formed according to the steps of: forming a lubricant layer on the oxide layer 4 to thereby initiate a chemical reaction, or in addition baking same so as to cause the lubricant layer to adhere to the oxide layer 4; cleaning the same by soapless soap cleaning, ultrasonic cleaning and trichloroethylene vapor cleaning in this order to thereby remove excessive lubricant which does not adhere to the oxide layer 4.

The following examples illustrate the features of the processes for manufacturing the present magnetic record member 7.

EXAMPLE 1

A disc type aluminum alloy substrate was finished to provide a surface having a slight topograph by turning and heating - flattening processes so that the alloy disc 1 may be made. The topograph in this case should be less than 50 microns in the circumferential direction and less than 10 microns in the radial direction. Then, a nickel - phosphorus (Ni-P) non-magnetic alloy was plated on the aluminum alloy substrate to about 50 micron-thickness. The Ni-P plated film was then finished to a mirror surface having a surface roughness of less than 0.04 micron and a thickness of about 30 microns using a mechanical polishing process. Next, a cobalt-nickel-phosphorus (Co-Ni-P) magnetic alloy was plated as a magnetic memory medium on the Ni-P-plated film surface to about 0.05 micron-thickness. Then, a solution of the following composition was mixed thoroughly and filtered through a filtering film to remove dust on precipitated $SiO_2$. The solution thus prepared was applied onto the surface of the Co-Ni-P alloy layer through to a spin coating process:

Ethyl alcohol solution including tetrahydroxysilane of 11 percent
Tetrahydroxysilane 11% ethyl alcohol solution: 20 weight percent
N-butyl alcohol: 80 weight percent More particularly, the disc-type aluminum alloy substrate on which the Ni-P alloy and Co-Ni-P alloy films were plated in this order, was rotated at a speed greater tha 200 r.p.m. (revolutions per minute) in a horizontal plane while the solution having the above-mentioned composition was being discharged from a cylindrical reservoir onto the disc surface during which the reservoir was shifted to the periphery of the disc. In this manner, the discharged solution was spread over the entire disc surface toward its outer periphery due to the centrifugal force exerted on the solution by rotation of the disc. When a solvent (ethyl) and butyl alcohols) of the solution discharged on the disc was evaporated, a polysilicate film was formed on the disc surface as the protective film 4. The disc having the protective film 4 of polisilicate was then baked in an electric furnace at a temperature of 200° C (degrees centrigrade) for three hours. After the disc was cooled in the electric furnace to a room temperature, dimetylsilicone oil permeated in a clean cloth free of dust and having a viscosity of 350 centipoise was applied onto the baked disc surface coated with polysilicate. The disc coated with the dimethylsilicone oil was then baked in the electric furnace at a temperature of 200° C for 8 hours and then cooled to the room temperature while remaining in the furnace. This baked disc having the dimethylsilicone oil was cleaned with a sponge containing a neutral cleaning agent followed by ultrasonic cleaning in water and then trichloroethylene vapor cleaning, whereby excessive dimethylsilicone oil was removed. In this manner, a magnetic record member was obtained for a magnetic disc device.

EXAMPLE 2

In a process similar to Example 1 above, a magnetic disc was made by using the dimethylsilicone oil of a viscosity of 1000 centipoise as lubricant.

EXAMPLE 3

In a manner similar to the present Example 1, a magnetic disc was formed by using the dimethylsilicone oil of a viscosity of 6000 centipoise as lubricant.

EXAMPLE 4

A magnetic disc was obtained by the above method and in which methyl phenyl silicone oil was employed as the lubricant.

EXAMPLE 5

In a process similar to Example 1 above, a magnetic disc was produced by using fluorosilicone oil as lubricant.

EXAMPLE 6

In a manner similar to Example 1 above, a polysilicate film was formed on the disc surface, and the disc was then immersed in 0.2% aqueous solution of ammonium-salt of octadecyltrichlorosilane, serving as a surface coupling agent, for 15 minutes. Next, the disc was rinsed with water and baked in an electric furnace at a temperature of 130° C for 30 minutes followed by cooling in the furnace, thereby forming a lubricant layer on a polysilicate film previously coated on the disc. Excessive lubricant was then removed in the same manner as in the above Example 1 to obtain a desired magnetic disc.

EXAMPLE 7

In a similar process to that of Example 1, a polysilicate film was formed on the disc surface, and the disc was then immersed in 0.2% xylene solution of hexamethyldisilazane serving as a surface coupling agent for 15 minutes. The disc was removed from the solution, rinsed with water and then baked in an electric furnace at a temperature of 130° C for 30 minutes followed by cooling while remaining in the furnace, thereby forming a lubricant layer on a polysilicate film coated on the disc. Next, excessive lubricant was removed in the same manner as set forth in Example 1.

EXAMPLE 8

In a similar process to that of Example 1, a Ni-P alloy film and a Co-Ni-P alloy film were plated in this order on an aluminum alloy disc through the plating process and the thus obtained disc was then coated with borosilicate glass having the composition shown below by the spattering process. The disc coated with the borosilicate glass was immersed in 0.2% aqueous solution of an ammonium-salt of octadecyltrichlorosilane serving as a surface coupling agent for 15 minutes. Next, the disc was rinsed with water, baked in the electric furnace at a temperature of 130° C for 30 minutes and then cooled therein. Excessive surface coupling agent was removed from the disc in a manner similar to that of Example 1.

$SiO_2$: 50.2%
BaO: 25.1%
$B_2O_3$: 13.0%
$Al_2O_3$: 10.7%
$AS_2O_3$: 0.4%

EXAMPLE 9

Similar to Example 1, an Ni-P alloy film and Co-Ni-P alloy film through the plating method were plated in this order on an aluminum alloy disc, and the disc was then coated with quartz glass ($SiO_2$) according to the spattering process. Dimetylsilicone oil was applied upon the disc surface coated with $SiO_2$ so as to form a lubricant layer in the same manner as in Example 1.

EXAMPLE 10

An Ni-P alloy film and a Co-N-P alloy film were plated in this order on an aluminum alloy disc by a plating process similar to that of Example 1, and the disc was coated with $Al_2O_3$ (amorphous alumina) through the spattering process. The disc coated with $Al_2O_3$ was immersed in 0.2% aqueous solution of ammonium-salt of octadecyltrichlorosilane serving as a surface coupling agent for 15 minutes. The disc was then rinsed with water, and next, the excessive surface coupling agent was removed from the disc in the same manner as Example 1.

Dynamic coefficients of friction exerted between the heads and the magnetic discs were measured by using respective magnetic discs obtained according to the Examples 1 to 10. In this measurement, each head was coupled to a strain gauge, while each disc was rotated at a given r.p.m. so as to measure the dynamic coefficient of friction. Also, the dynamic coefficient of friction was divided by a load applied to the head.

A smaller dynamic coefficient of friction was obtained from the magnetic disc having a protective film of an amorphous inorganic oxide layer treated with lubricant compared with that of a magnetic disc having an inorganic oxide layer not treated with lubricant. Moreover, a smaller dynamic coefficient of friction was obtained from a magnetic disc subjected to the lubrication treatment with a lubricant having a higher viscosity (having a longer molecular chain) in terms of the same kind of oil such as, for instance, dimethylsilicone oil.

The results of the aforesaid measurements are shown in the following Table in which the load on the disc and the sliding speed were 5 grams and 100 mm/min., respectively:

TABLE

| Ex. | Amorphous inorganic oxide layer | Lubricant | Dynamic coefficient of friction |
|---|---|---|---|
| — | Polysilicate | none | 0.220 |
| 1 | " | Dimethylsilicone oil (350CP*) | 0.160 |
| 2 | " | Dimethylsilicone oil (1000CP) | 0.130 |
| 3 | " | Dimethylsilicone oil (60000CP) | 0.046 |
| 4 | " | Methylphenylsilicone oil | 0.120 |
| 5 | " | Fluorosilicone oil | 0.135 |
| 6 | " | Octadecyltrichlorosilane | 0.160 |
| 7 | " | Hexamethyldisilazane | 0.160 |
| — | Borosilicate glass | none | 0.190 |
| 8 | " | Octadecyltrichlorosilane | 0.130 |
| — | $SiO_2$ | none | 0.220 |
| 9 | " | Dimethylsilicone oil (350CP) | 0.150 |
| — | $Al_2O_3$ | none | 0.200 |
| 10 | " | Octadecyltrichlorosilane | 0.160 |

*CP ... centipoise viscosity unit

The following three advantages were obtained from a magnetic disc having a protective film of the amorphous inorganic oxide layer subjected to the lubrication treatment and having a low dynamic coefficient of friction:

1. Reduction of the load imposed on the disc drive motor:

The reduction in the frictional force caused between the disc subjected to the lubrication treatment and the head leads to the reduction in torque required for the disc drive motor. In other words, in the case of the disc not subjected to the lubrication treatment, a torque of 210 g.mm (gram. millimeter) per head was required. However, in the case of a disc subjected to the lubrication treatment, a torque of less than 40 g.mm was all that was required. This implies that this contributes to the reduction in size of motors in case where a plurality of heads are used.

2. Increase in head-attitude margin:

Due to the small frictional force caused between the head and the magnetic disc subjected to the lubrication treatment, the head-attitude margin representing the stablity of the head upon initiation and completion of operation was incrased. More definitely, a twisting angle $\theta_x$ and a radial twisting angle $\theta_y$ were increased from −50 minute to +50 minute and −2° to +2° (without the lubricating treatment) to −1° to +1° and −4° to +4°, respectively.

3. Improvements in crush-resisting and abrasion-resisting properties:

Excellent crush-resisting and abrasion-resisting properties due to the reduced frictional force exerted between the head and the magnetic disc were obtained. This advantage is particularly greater in the case of a head requiring a large load (monolithic head and IBM 2314 typehead). More particularly, the magnetic discs obtained by the examples 1 to 10 and the monolithic head with a seventy-gram load were used for friction and abrasion tests of the head repeated at 30000 cycles. The results showed that no change was observed in a surface condition of the discs due to the frictional contact of the head and due to the head-crushing.

In the above examples, an aluminum alloy disc, a Ni-P alloy layer and a Co-Ni-P alloy layer were used as the alloy disc 1, the non-magnetic alloy layer 2 and the magnetic metal thin film medium 3, respectively. For this reason, a baking temperature of the protective film was restricted to less than 300° C, preferably in the neighborhood of 200° C. However, if a combination of an alloy disc having less thermal change, a non-magnetic alloy layer and a magnetic thin film medium is used, such a restriction imposed on the above temperature will be unnecessary.

In addition, an aluminum alloy disc was used as the alloy disc 1 and a Ni-P alloy layer was used as the non-magnetic alloy layer 2 coated on the alloy disc and polished to a mirror surface in the Examples. However, if the alloy disc such as a titanium alloy disc polished to a mirror finish is used, the non-magnetic alloy layer 2 is unnecessary so that a protective film may be formed by plating the magnetic metal thin film medium on the alloy disc having its surface polished to a mirror finish.

Although there has been described a preferred embodiment of this novel invention, many variations and modifications will now be apparent to those skilled in the art. Therefore, this invention is to be limited, not by the specific disclosure herein, but only by the appending claims.

What is claimed is:

1. A magnetic record member, comprising:
   an alloy disc having a slightly topographical surface of not more than 50 microns in the circumferential direction and not more than 10 microns in the radial direction of said disc;
   a non-magnetic alloy layer coated on said surface of said alloy disc, said alloy having a surface polished to a mirror finish;
   a magnetic metal thin film medium coated on said polished surface of said non-magnetic alloy layer;
   an amorphous inorganic oxide layer coated on said medium;
   a silicon containing lubricant layer coated on said surface of said oxide layer and oriented so as to adhere to said oxide layer.

2. The record member of claim 1, wherein said lubricant layer comprises a silicon based oil.

3. The record member of claim 1, wherein said lubricant layer comprises a silicon type-surface coupling agent.

4. The record member of claim 1, wherein said oxide layer is a polysilicate.

5. The record member of claim 1, wherein said polysilicate consists of a condensated polymer of tetrahydroxysilane.

6. The record member of claim 1 wherein said amorphous inorganic oxide layer is chosen from the group of quartz glass, silicate glass, borate glass, borosilicate glass, phosphate glass or amorphous alumina.

7. The record member of claim 1, wherein said polished surface has a center line average height of 0.04 microns.

8. A magnetic record member, comprising:
   an alloy disc whose surface is polished to a mirror finish, said surface having a topography of not more than 50 microns in the circumferential direction and not more than 10 microns in the radial direction of said disc;
   a magnetic thin film medium coated on said polished surface of said alloy disc;
   an amorphous inorganic oxide layer coated on said medium;
   a silicon containing lubricant layer formed on a surface of said oxide layer and oriented so as to adhere to said oxide layer.

9. The record member of claim 8, wherein said lubricant layer comprises a silicon based oil.

10. The record member of claim 8, wherein said lubricant layer comprises a silicon type-surface coupling agent.

11. The record member of claim 8, wherein said oxide layer is a polysilicate.

12. The record member of claim 11, wherein said polysilicate is a condensated polymer of tetrahydroxysilane.

13. The record member of claim 8, wherein said amorphous inorganic oxide layer is chosen from the group of quartz glass, silicate glass, borate glass, borosilicate glass phosphate glass or amorphous alumina.

14. The record member of claim 8, wherein said polished surface has a center line average height of 0.04 microns.

15. A process for manufacturing a magnetic record member, comprising the steps of:
   providing an alloy disc having a non-magnetic alloy layer coated on one surface thereof, said one surface of said alloy disc having a topography of not more than 50 microns in the circumferential direction and not more than 10 microns in the radial direction of said disc, said non-magnetic alloy layer having a surface polished to a mirror finish;
   forming a magnetic metal thin film medium on said polished surface;
   forming an amorphous inorganic oxide layer on said medium;
   applying a silicon containing lubricant onto a surface of said oxide layer, said lubricant having an orientation which will cause said lubricant to adhere to said oxide layer.

16. The process of claim 15 wherein said oxide layer is a polysilicate.

17. The process of claim 16 wherein said polysilicate consists of a condensated polymer of tetrahydroxysilane.

18. The process of claim 15 wherein said amorphous inorganic oxide layer is chosen from the group of quartz glass, silicate glass, borate glass, borosilicate glass, phosphate glass or amorphous alumina.

19. The process of claim 15 further including the step of baking said disc thus treated.

20. A process for manufacturing a magnetic record member comprising the steps of:
   providing an alloy disc whose surface is polished to a mirror finish, the surface of said disc having a topography of not more than 50 microns in the circumferential direction and not more than 10 microns in the radial direction of said disc;
   forming a magnetic metal thin medium on said surface of said disc;
   forming an amorphous inorganic oxide layer on said medium;
   applying a silicon containing lubricant having an orientation to a surface of said oxide layer;
   making said disc thus treated so that said lubricant is caused to adhere to said oxide layer.

21. The process of claim 20, wherein said oxide layer is a polysilicate.

22. The process of claim 21, wherein said polysilicate consists of a condensated polymer of tetrahydroxysilane.

23. The process of claim 20, wherein said amorphous inorganic oxide layer is chose from the group of quartz glass, silicate glass, borate glass, borosilicate glass, phosphate glass or amorphous alumina.

* * * * *